Aug. 4, 1936.  F. D. CHAPMAN  2,049,639
TREATING FOOD PRODUCTS
Filed Aug. 22, 1935  2 Sheets-Sheet 1
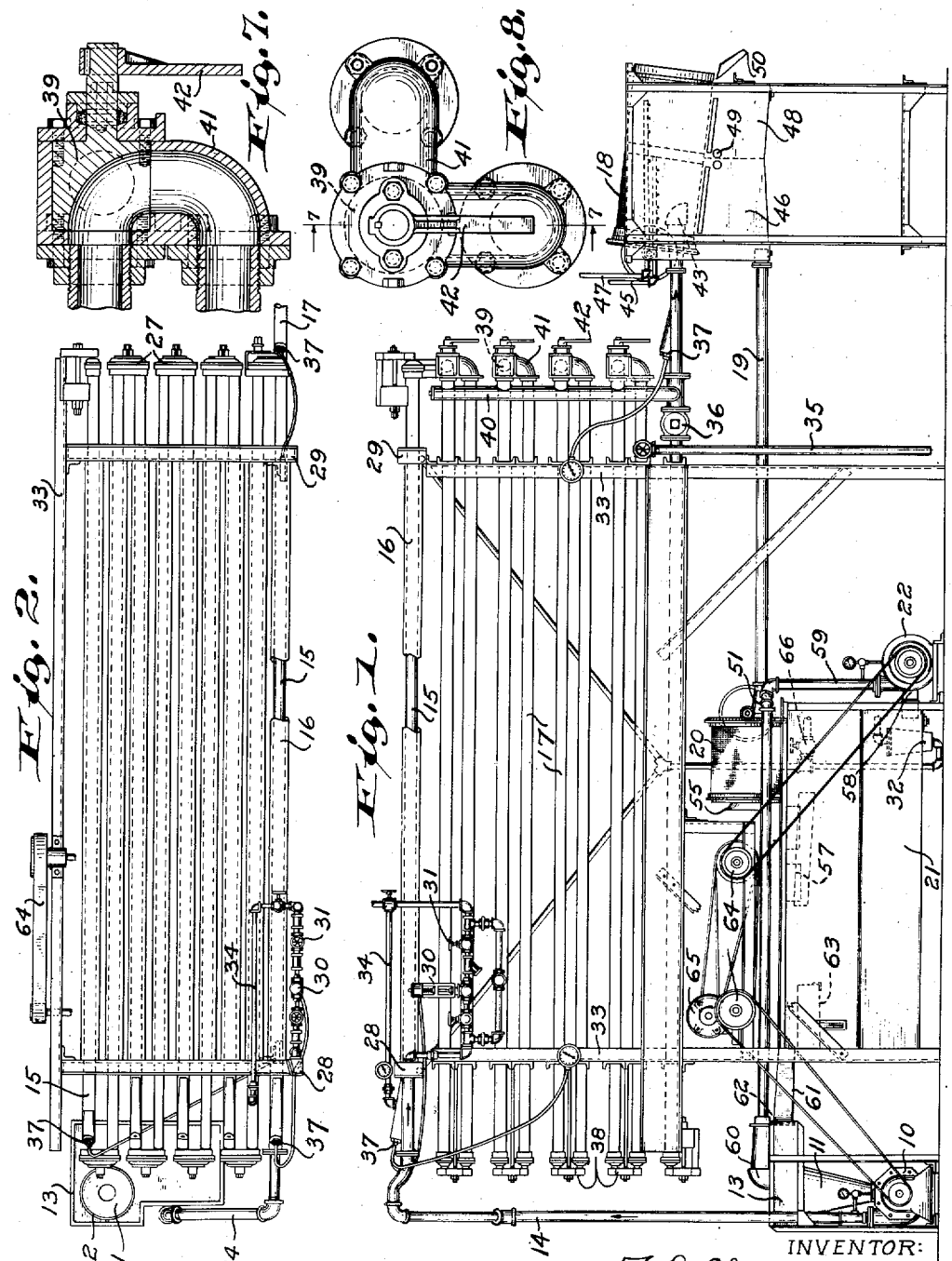
INVENTOR:
BY F. D. Chapman
Morsell, Lieber & Morsell
ATTORNEYS.

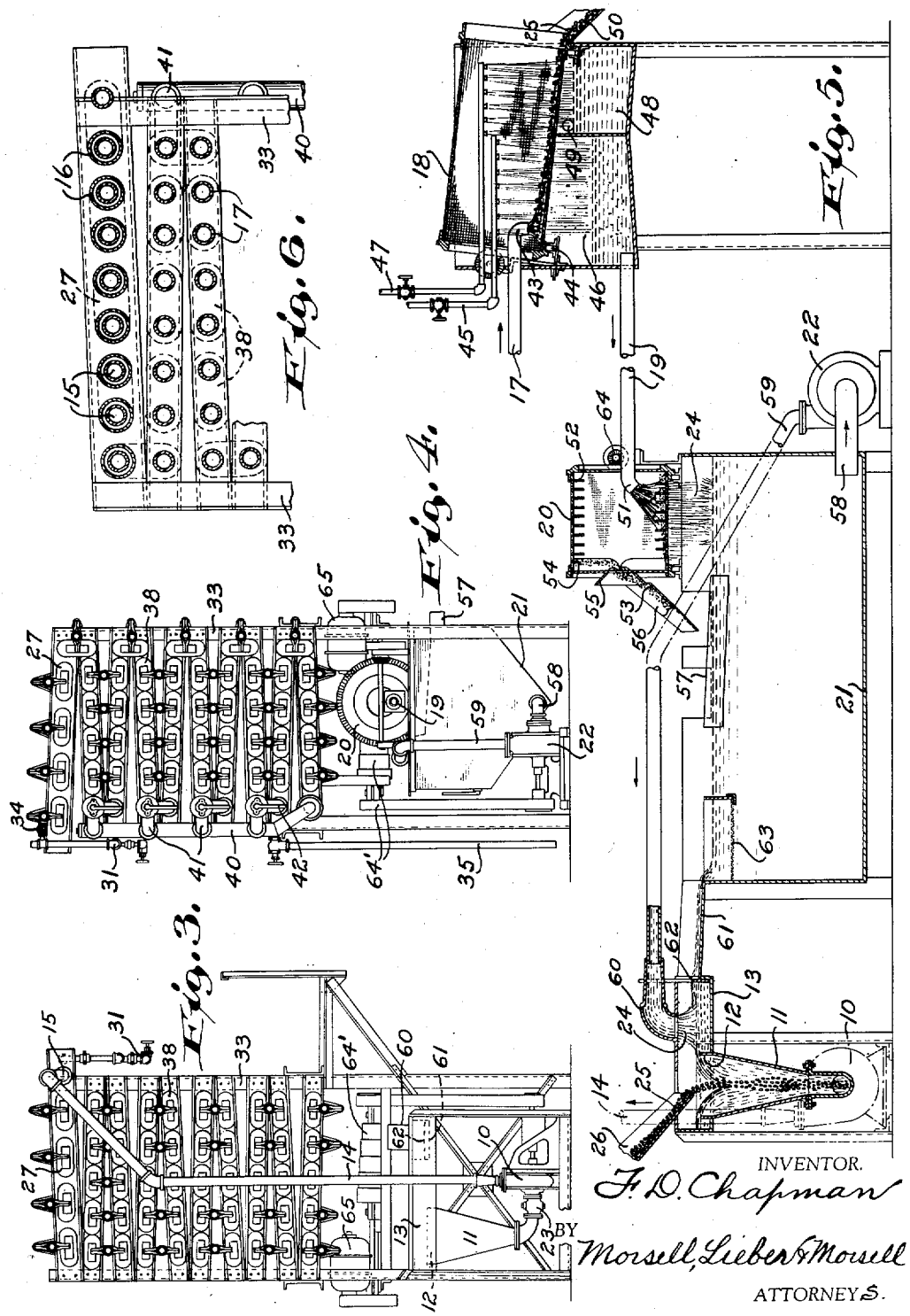

Patented Aug. 4, 1936

2,049,639

UNITED STATES PATENT OFFICE 2,049,639

TREATING FOOD PRODUCTS

Frank D. Chapman, Berlin, Wis.

Application August 22, 1935, Serial No. 37,321

26 Claims. (Cl. 53—18)

The present invention relates in general to improvements in the art of treating food products, and relates more specifically to improvements in the construction and operation of apparatus for hydraulically transporting and for simultaneously heat treating certain granular edible substances such as vegetable seed, small fruits, or like products.

Generally defined, an object of the present invention is to provide an improved method of and apparatus for heat treating relatively granular edible substances in a most efficient manner.

It has heretofore been proposed as covered by Patent No. 1,761,727, granted June 6, 1930 to Ernst Hecker, to provide apparatus for heat treating granular material such as small fruits, by simultaneously transporting and heating the food during passage of a mixture of the fruit particles and a liquid through a casing or conduit. This prior process is applicable to any relatively granular food material for the purpose of blanching, pasteurizing, sterilizing, cooking, or otherwise heat treating the product, but due to the varying characteristics of different, or even successive batches of the same commodity, it is desirable to vary the period of treatment so as to secure most effective results. It is also necessary to exercise great care in the handling of some relatively delicate granular materials, not to damage the particles during transportation thereof, and in my prior application Serial No. 34,740, filed August 5, 1935, is disclosed an improved hydraulic conveying system which is especially adapted to hydraulically transport such tender and delicate substances. With this improved conveying system, the granules are injected into a vortex of liquid entering the inlet of a specially constructed rotary pump, and the mixture delivered from the pump rotor is urged through a conveyor conduit at the discharge end of which the washed granules are removed, and the separated liquid is subsequently clarified and returned to the pump with fresh granules which are to be conveyed and treated. With such a conveying system the granular substance can be most effectively transported, and the present improvement involves a food treating system wherein the advantageous features of both of the above prior systems are combined with most effective results.

It is therefore a more specific object of the present invention to provide an improved hydraulic conveying and heat treating system whereby granular commodities may be treated for variable periods of time dependent upon their specific characteristics, without danger of damaging or of degrading the granules.

Another specific object of the invention is to provide an improved automatic blancher for green peas or the like, which will most effectively treat the commodity with minimum waste of liquid.

A further specific object of the invention is to provide an improved continuous blancher or cooker wherein the product is uniformly heat treated, and in which the degree or extent of treatment may be quickly varied.

Still another specific object of the invention is to provide an improved blanching system wherein the volume of mixture of conveying liquid and granular material may be maintained constant so as to permit accurate control of the treating temperature.

An additional specific object of the invention is to provide improved conveying and heat treating apparatus comprising one or more circulating pumps, and means for tempering the liquid returned for re-circulation through the system so as to insure most effective operation of the pumps.

Another important object of the present invention is to provide an improved blancher which can be readily and thoroughly sterilized or cleansed, and which may therefore be maintained in highly sanitary condition at all times.

Still another specific object of the present invention is the provision of an improved food treating system comprising a conveyor conduit and a pump within the conduit for normally urging a mixture of liquids and legumes therethrough, the system being provided with means for simultaneously sterilizing the interiors of both the pump and conduit when the opposite ends of the latter are closed; and as to this particular feature, the present application is a continuation in part of my co-pending application Serial No. 34,740, filed August 5, 1935.

These and other specific objects and advantages will be apparent from the following detailed description.

A clear conception of the successive steps of treatment involved in the present improvement, and of the mode of constructing and of operating blanching apparatus built in accordance with the invention, may be had by referring to the drawings accompanying and forming a part of this specification, in which like reference characters designate the same or similar parts in the various views.

Fig. 1 is a somewhat diagrammatic side elevation of an improved blancher adapted for exploitation of the improved heat treating method;

Fig. 2 is a similar plan view of the heat treating portion of the improved system;

Fig. 3 is an end view of the apparatus, looking toward the inlet end thereof;

Fig. 4 is an opposite end view of the assemblage, looking toward the discharge end thereof;

Fig. 5 is an enlarged somewhat diagrammatic and part sectional view of the liquid separating, return and inlet portions of the improved system;

Fig. 6 is an enlarged transverse section through a fragment of the initial heat applying portion of the system;

Fig. 7 is a further enlarged vertical section through one of the by-pass valves for regulating the period of treatment, the section being taken on line 7—7 of Fig. 8; and Fig. 8 is a similarly enlarged end view of the valve shown in Fig. 7.

Although the invention has been shown and described herein as being specifically applied to a system and apparatus for blanching green peas or the like, it is not intended to unnecessarily restrict the scope by virtue of such specific embodiment, since the improved features are obviously more generally applicable to other types of continuous or intermittently operated systems for heat treating other edible commodities.

Referring to the drawings, the improved hydraulic conveyor and blancher shown therein, comprises in general, a rotary conveyor pump 10 having an axial inlet communicating through an open funnel 11 and over an annular weir 12 with a liquid supply reservoir 13, and also having a peripheral discharge communicating directly with a conveyor conduit 14; a series of upper heating coils or pipes 15 communicating with the conduit 14 and surrounded by steam jackets 16; superimposed groups of pipes 17 communicating with the delivery end of the last pipe 15 and arranged in series beneath the heating coils; a main separator or relatively coarse revolving screen 18 for receiving the mixture of liquid and granules discharged from the last pipe 17 and for separating the solids from the liquid; a return conduit 19 leading from the main screen 18 to an auxiliary separator or relatively fine revolving screen 20; a liquid supply tank 21 for receiving relatively pure liquid from the screen 20; and a circulating pump 22 for withdrawing liquid from the tank 21 and for delivering the same to the supply reservoir 13.

The main conveyor pump 10 is preferably of the centrifugal type used for pumping trash and having a rotor provided with large, unobstructed, and relatively smooth passages adapted to prevent clogging, and a shut-off valve 23 is preferably disposed in the pump suction between the lower end of the funnel 11 and the pump inlet opening. The funnel 11 may be of any suitable shape and the weir 12 at the upper end thereof extends into the reservoir 13 so as to permit free flow of an abundant quantity of liquid 24 thereover in the form of a vortex as illustrated in Fig. 5. The granular material or peas 25 may be delivered centrally into the vortex of liquid 24 flowing through the funnel 11, preferably below the crest of the weir 12, by means of a supply chute 26, thereby producing a swirling mixture with the peas confined centrally therein, which passes directly into and through the rotor of the pump 10. The conveyor conduit 14 which receives this mixture from the pump 10, may be of any desired diameter, length and disposition, and preferably has an unobstructed interior.

The upper heating pipes 15 are disposed substantially horizontal and are connected in series by quickly removable hinged end connectors 27 so that the receiving pipe of the group is disposed somewhat higher than the delivery pipe as illustrated in Figs. 3 and 4. The steam jackets 16 surround the pipes 15 and communicate with inlet and exhaust headers 28, 29 respectively, and steam may be supplied to these jackets through the supply header 28 past automatic temperature control mechanism 30 and steam valves 31 of well known construction. The joints between the headers 28, 29 and the pipes 15, are formed to permit relative expansion and contraction of the concentric tubes, and the headers 28, 29 may be connected to a steam trap 32 as shown in Fig. 1, which is adapted to deliver the condensate drainage from the jackets 16, into the supply tank 21, or into the atmosphere, as desired.

The pipes 15, 17 are supported upon a rack or frame 33, and the individual pipes 17 are likewise disposed substantially horizontal while the successive groups are disposed in slightly oppositely inclined planes as illustrated in Figs. 3 and 4. One of the upper pipes 15 may be provided with a direct steam supply connection 34, and one of the lower pipes 17 may be provided with a combined safety valve and drain 35, while the last of the lower pipes 17 is preferably provided with a shut-off valve 36 similar in construction to the valve 23. These valves 23, 36 are preferably so constructed, that when open, they entirely avoid obstruction to the flow so that no damage by impact of the granules against projecting ledges, can possibly result. Several of the pipes 15 of the uppermost group, and at least one of the pipes 17 of the lowermost group, are provided with thermometers 37 for indicating the temperatures existing within the mixture conveying conduit at the beginning and end of the final heat treating pipes 17. The pipes 17 and the successive superimposed groups of these pipes are normally connected in series by quickly removable hinged end connectors 38 similar in construction to the connectors 27, but successive superimposed pairs of groups of these pipes are capable of being cut out of the path of flow of the mixture in order to control the heat treating period, by means of a series of by-pass valves 39 cooperating with a by-pass conduit 40.

The conduit 40 may be located at one side of the rear end of the apparatus as shown in Figs. 1 and 4, or at the opposite side as shown in Figs. 7 and 8, and extends vertically from the upper group of pipes 17 into the lowermost discharge pipe 17 leading into the screen 18. Each of the by-pass valves 39 is disposed within a casing 41 and is operable by a handle 42, and when these handles 41 are set vertically, the fluent mixture of liquid 24 and peas 25 is adapted to travel through all of the pipes 17 in series, thereby insuring maximum time of processing. When the lower valve 39 and the valve 36 are closed, the three lower groups of tubes or pipes 17 are cut out, and the mixture is by-passed around these three lower groups through the lower portion of the pipe 40. So, by switching any selected valve 39, and the valve 36, the length of the path of travel of the mixture may be varied as desired, and by switching the uppermost valve 39 and closing the valve 36, the mixture will be caused to travel only through the uppermost group of pipes 17. The valves 39 are constructed as shown in detail in Figs. 7 and 8, and likewise afford an unobstructed passage for the mixture of liquid and granular material.

The lowermost pipe 17 and the by-pass pipe 40 communicate with the interior of the main separating screen 18 through an elbow 43 which delivers the mixture downwardly into the upper end of the inclined screen drum, as shown in Figs. 1 and 5. The rotary screen 18 is revolvable upon roller supports 44, and the mixture of liquid 24 and peas 25 delivered into this screen, is immediately subjected to cooling sprays which are precipitated into the drum through a valve controlled tempering water supply pipe 45 extending along the upper interior of the inclined screen 18. The conveying and tempering liquids and the debris, are delivered through the upper portion of the screen drum into a compartment 46 which communicates at its lower portion with the return pipe 19 leading to the auxiliary screen 20. The separated peas 25 are conveyed by the rotation and inclination of the screen 18, into the lower portion of the drum where they are subjected to other cooling or heating jets of liquid delivered into the screen drum through a valve controlled pipe 47 also extending along the upper interior of the screen 18. The cooling or heating liquid from the pipe 47 eventually passes through the screen 18 into a second compartment 48 having an overflow 49, and the finally treated peas 25 are discharged from the screen onto a delivery chute 50.

The return pipe 19 likewise communicates with the interior of the horizontally disposed auxiliary screen 20 through a downwardly directed elbow 51, and the interior of this screen is provided with a helical flight 52 for conveying the debris 53 therealong, and with lifting vanes 54 and a delivery cone 55 for elevating and discharging the separated debris upon a discharge chute 56, as shown in Fig. 5. The separated liquid 24 which has been cooled and tempered by the liquid admitted through the pipe 45, is precipitated from the screen 20 directly into the main supply tank 21, and the screen 20 may also be rotatably mounted upon roller supports 56 similar to the supports 44 of the main screen.

The liquid supply tank 21 is preferably of considerable capacity, and has an adjustable overflow 57 near the upper portion of the outlet end thereof. The suction pipe 58 of the circulating pump 22, communicates with the lower portion of the outlet end of the tank 21, and the discharge pipe 59 of the pump 22 has a delivery nozzle 60 for precipitating the fresh conveying liquid directly into the supply reservoir 13. The reservoir 13 is also connected with the opposite end of the main supply tank 21 by a sluice 61, the liquid receiving end of which is provided with a vertically adjustable gate 62 and the opposite end of which is directed into a screen 63 disposed within the tank 21 and adapted to catch peas which might enter the tank from the reservoir 13 when the conveyor system is shut down.

The apparatus is provided with suitable, variable speed driving mechanism 64 including a variable speed pulley 64', operable by a common electric motor 65, for simultaneously propelling the pumps 10, 22 and the screens 18, 20; and the variable speed pulley 64' is important since it permits variation in the speed of the pump 10 so as to produce constant speed of the mixture flowing through the pipes 17 when the effective length of the passage is varied. A suitable fresh water supply pipe operable by a float riding either on the liquid within the reservoir 13, or in the tank 21, may also be provided, in order to insure an abundant supply of conveying and treating liquid at all times, and when the apparatus is functioning normally, the operation is entirely automatic. If so desired, fresh water may also be admitted to the tank 21 through the steam trap 32 past a valve 66 as shown in Fig. 1, and a similar valve controlled connection may also be provided for draining the condensate from the trap to the atmosphere.

During normal operation of the improved apparatus for treating foods, and when the device is being actuated as a cooker or blancher for green peas, the pumps 10, 22 and the screens 18, 20 are set in motion by actuation of the motor 65, thereby causing the pump 22 to deliver a constant stream of liquid from the tank 21 through the discharge pipe 59 and nozzle 60 to the reservoir 13 and simultaneously causing the pump 10 to deliver a substantially constant stream of mixture of liquid 24 and peas 25 dependent upon the speed of rotation of the pump rotor, through the conduit 14 to the upper heating pipes 15. The weir 12 cooperating with the overflow gate 62, admits the liquid to the cone 11 in the form of a vortex, and the peas 25 being delivered below the crest of the weir 11, are deposited into the center of this vortex thereby maintaining the volume of the mixture entering the pump 10 while operating at a fixed speed, substantially constant irrespective of variations in the quantity of peas 25 delivered from the chute 26. The whirling of the liquid causes the peas to be drawn into the pump 10 and to be delivered therefrom, without injuring the granules, and by virtue of the unobstructed nature of the conduit 14 and of the subsequent passages, the peas will not be damaged.

As the mixture flows through the upper pipes 15, the steam admitted to the jackets 16 will effectively heat the liquid conveying medium and the peas, and during subsequent travel of the mixture through the lower processing pipes 17, the granular particles are entirely cooked and blanched for a definite period of time. This blanching and cooking period may obviously be readily varied by cutting out one or more groups of the processing pipes 17 and by simultaneously changing the speed of the pump 10 so as to maintain the speed of travel of the mixture constant, and such adjustment in the length of the conveying conduit can be quickly effected by manipulation of the valves 39. Any number of the groups of lower pipes 17 may be thus eliminated and if the upper valve 39 is switched so as to connect the upper group of pipes with the by-pass 40, none of the subsequent pipes 17 will be effected. It is preferable when manipulating any of the valves 39, to close the cut-off valve 36 in order to prevent some of the mixture from backing into the lowermost pipes 17. The treated mixture delivered from the lower pipes 17 is discharged into the main screen 18 past the elbow 43, and is immediately cooled and tempered by the admission of water through the pipe 45. As the peas roll downwardly within the screen 18, the liquid drains therefrom through the perforations of the screen and drops into the compartment 46. The separated peas are subsequently further either heated or cooled and simultaneously washed by liquid delivered from the pipe 47 into the lower portion of the screen, and this liquid drains into the compartment 48 and is ultimately discharged through the overflow 49. The finally treated peas are eventually discharged over the chute 50 and may be subsequently packed or further treated.

The liquid from the compartment 46 is returned through the pipe 19 to the auxiliary screen 20 where the debris 53 is removed. The purified liquid passing into the screen 20 drops into the supply tank 21 from whence it is ultimately again removed by the pump 22 and is delivered to the reservoir 13 for subsequent use. The level of the liquid in the reservoir 13 may be varied to suit by adjustment of the gate 62, thereby varying the height of the liquid in this reservoir and the quantity of overflow liquid returned to the tank 21 over the sluice 61. Fresh liquid may also be admitted to the system as needed, by manipulation of the valves 66 or otherwise, and it will be apparent that when the system has once been placed in operation, it functions entirely automatically to convey and to simultaneously process the peas. Because of the fact that the quantity of the mixture admitted to the pump 10 is always maintained substantially constant for any predetermined pump speed, the peas 25 will be uniformly and thoroughly heat treated, irrespective of variations in the quantity of peas supplied to the apparatus. If the conveying and treating passage is lengthened or shortened, the pump speed must be varied with the aid of the cone pulley 64', in order to maintain uniform velocity of the flow of mixture and thus insure uniform treatment of all of the peas.

If for any reason the system is shut down, the peas from within the pump 10, due to their buoyancy will float upwardly through the funnel 11 and over the dam or weir 12 into the reservoir 13, where they may be readily removed. Any peas which might float over the gate 62 are deposited into the screen 63, and may also be readily removed therefrom without entering the remaining portion of the tank 21. The level of the liquid within the tank 21 may be varied by adjusting the overflow plate 57, and after the system has actually been stopped, it can readily be restarted without danger of clogging and without damaging peas that may remain in the pipes. The cooling liquid admitted through the pipe 45, serves to effectively temper the heat liquid returned to the tank 21, so that it may be returned to the reservoir 13 by the pump 22 at relatively low heat.

If it becomes desirable to sterilize the interior of the pipes 15, 17, of the conduit 14, and of the pump 10, it is only necessary to close the valves 23, 36, and to open the valve in the steam pipe 34, whereupon steam will be admitted to the interior of these conduit forming elements. When such sterilization is being effected, all of the valves 39 should be opened, and it is not necessary to admit steam to the jackets 16 during sterilization of the piping. The temperature of the mixture within the piping can be readily ascertained with the aid of the thermometer 37, and the admission of steam to the jackets 16 may be regulated accordingly. The liquid from within the pipes 15, 17 may be drained at any time through the pipe 35, and the interiors of the pipes 15, 17 are also made readily accessible for cleaning, by virtue of the removability of the connectors 27, 38, thereby making it possible to maintain the system in sanitary condition at all times, and to prevent freezing of the liquid remaining in the conveying conduit.

From the foregoing description it will be apparent that the present invention provides simple, compact, and highly efficient mechanism for heat treating granular food products, and especially for exploiting the process disclosed in the Hecker patent hereinabove referred to. The improved apparatus permits rapid and effective variation in the period of treatment of the commodity, and also insures uniform treatment of all commodities passing therethrough. The conveying and heating liquid can be readily removed from the treated product and re-utilized for subsequent treating operations, and the improved apparatus has proven highly successful in actual commercial operation. The introduction of tempering fluid through the pipe 45 not only serves to replenish the supply of liquid to the system, but also serves to prevent excessive heating of the liquid in the tank 21, thereby insuring most efficient operation of the pump 22.

While the apparatus specifically shown and described is especially adapted for use as a blancher, it may obviously be used for other heat treating purposes and with products other than green peas. It is also to be noted, that the relative location of the heating coils and of the pumping and separating apparatus may be varied to suit conditions. In the specific embodiment shown, the pipes 15, 17 are disposed above the pumps 10, 22, tanks 13, 21 and screens 18, 20; but these pipes may be disposed laterally of or even below the pumping and separating apparatus, so as to permit convenient delivery of the treated product to a subsequent canning machine, or to insure greater pressure thereon during the processing operation.

It should be understood that it is not desired to limit the present invention to the exact details of the construction and to the precise mode of operation herein shown and described, for various modifications within the scope of the claims may occur to persons skilled in the art.

I claim:—

1. A system for treating food, comprising, means forming a conduit for conveying a mixture of heated liquid and food particles, and means for varying the length of said conduit to vary the period of time that said mixture is confined within said conduit.

2. A system for treating food, comprising, means comprising a succession of tubular sections forming a conduit for conveying a mixture of heated liquid and food particles, and means for varying the effective length of said conduit by varying the total number of active sections.

3. A system for treating food, comprising means forming a conduit for conveying a mixture of liquid and food particles, means for continuously admitting substantially constant quantities of the mixture to said conduit, means for heating the mixture at an initial portion of said conduit, and means for effecting variation in the period of subsequent confinement of the mixture within said conduit.

4. A system for treating food, comprising, means forming a conduit for conveying a mixture of liquid and food particles, means for continuously admitting substantially constant quantities of the mixture to said conduit, means for heating the mixture at an initial portion of said conduit, and means for varying the effective length of said conduit.

5. A system for treating food, comprising, means forming a closed passage for conducting a mixture of liquid and food particles along a definite path, means for admitting liquid and solid food particles to said conduit, a pump in said conduit beyond said admission means for continuously urging substantially constant quantities of the mixture through said passage, and means for heating the admitted liquid to a sufficient extent to completely sterilize the entrained food particles.

6. A system for treating food, comprising, means forming a closed passage for conducting a mixture of liquid and food particles along a definite path, means for continuously urging substantially constant quantities of the mixture through said passage, means for heating the admitted liquid to a sufficient extent to completely sterilize the entrained food particles, and means for varying the effective length of said passage so as to alter the period of heat transference.

7. A system for treating food, comprising, a series of superimposed pipes forming a continuous conveying conduit, means for heating an upper pipe of said series, means for delivering a mixture of liquid and solids into said pipes past said heating means, and means for varying the effective length of said conduit by varying the number of lower pipes in said series.

8. A system for treating food, comprising, a series of superimposed pipes forming a continuous conveying conduit, means for heating an upper pipe of said series, means for delivering a mixture of liquid and solids into said pipes past said heating means, means for automatically maintaining the quantity of mixture admitted substantially constant, and means for varying the effective length of said conduit by varying the number of lower pipes in said series.

9. In a combination, a series of tubular members forming a conduit, means for heating a portion of said conduit, a pump directly in said conduit in advance of said heating means for delivering a mixture of liquid and peas through said conduit, means for separating the peas from the liquid discharged from said conduit, and means for returning the separated liquid and other peas to said pump.

10. In combination, a series of tubular members forming a conduit, means for heating a portion of said conduit, a pump directly in said conduit in advance of said heating means for delivering a mixture of liquid and peas through said conduit, means for varying the effective length of said conduit beyond said heating means, means for separating the peas from the liquid discharged from said conduit, and means for returning separated liquid and other peas to said pump.

11. In combination, a series of tubular members forming a conduit, means for heating an initial portion of said conduit, a pump for delivering a mixture of liquid and peas to said conduit, an annular weir for delivering a vortex of liquid to said pump, means for delivering peas into said vortex beyond said weir, and means for varying the effective length of said conduit beyond said heating means.

12. In combination, a series of tubular members forming a conduit, means for heating an initial portion of said conduit, a pump for delivering a mixture of liquid and peas to said conduit, an annular weir for delivering a vortex of liquid to said pump, means for delivering peas into said vortex beyond said weir, means for varying the effective length of said conduit beyond said heating means, and means for separating the peas from the liquid leaving said conduit and for returning the separated liquid to said pump over said weir.

13. In combination, means forming a conduit, a pump for delivering a mixture of liquid and granules to said conduit, a weir for delivering a vortex of liquid to said pump, means for delivering granules into said vortex beyond said weir, and means for varying the quantity of liquid delivered to said pump over said weir.

14. In combination, means forming a conduit, a pump for delivering a mixture of liquid and granules to said conduit, a weir for delivering liquid to said pump, means for delivering granules to said pump beyond said weir, means for separating the granules from the liquid discharged from said conduit, a vessel for receiving the separated liquid, and means for delivering variably adjustable quantities of liquid from said vessel to said pump past said weir.

15. In combination, a pump, a weir for delivering liquid to said pump, means for delivering granules to said pump beyond said weir, a reservoir for delivering liquid directly over said weir, a supply tank and means for delivering liquid therefrom to said reservoir, and an adjustable gate for regulating the quantity of liquid passing over said weir.

16. In combination, a pump, a weir for delivering a vortex of liquid to said pump, means for delivering granules to said pump beyond said weir, a reservoir for supplying liquid directly to said weir, a liquid tank, a sluice connecting said reservoir and said tank, and an adjustable gate in said sluice for regulating the quantity of liquid flowing over said weir.

17. In combination, a series of pipes cooperating to form a continuous conduit, means for delivering liquid to said conduit, means for heating an initial portion of said conduit, and a series of by-pass valves for varying the effective length of said conduit beyond said heating means for varying the number of said pipes in said series.

18. In combination, a plurality of superimposed pipes forming a conduit, means for delivering a mixture of liquid and granular material to the upper end of said conduit, means for heating said mixture through an upper of said pipes, a by-pass pipe, and a series of by-pass valves for connecting the lower conduit forming pipes with said by-pass pipe so as to vary the effective length of said conduit.

19. A system for treating food, comprising, a series of superimposed pipes forming a continuous unobstructed conduit for the passage of a mixture of liquid and granular food, a steam jacket segregated from and surrounding an upper pipe of said series, and a centrifugal pump for receiving and for urging the mixture through said pipes.

20. A system for treating food, comprising, a series of adjacent tubular members, detachable end members connecting the corresponding ends of said tubular members to form a circuitous unobstructed continuous conduit, means for delivering a mixture of liquid and solids to said conduit, and means for disconnecting said end members to permit free inspection of the interiors thereof.

21. A food treating system, comprising, means forming a conduit, a pump for delivering a mixture of liquid and granules through said conduit, means for delivering a vortex of the mixture to said pump, and means for varying the effective length of said conduit beyond said pump.

22. A food treating system, comprising, means forming a conduit, a pump for propelling a mixture of liquid and legumes through said conduit, means for heating a medial portion of said conduit beyond said pump, and means for delivering a vortex of the mixture into said conduit in advance of said pump.

23. A food treating system, comprising, a series of superimposed tubular sections having their corresponding ends connected to provide an elongated conduit, a centrifugal pump having a rotor within said conduit for propelling a mixture of liquid and legumes therethrough, means for heating said conduit beyond said pump, and means for delivering a vortex of the mixture into said conduit directly in advance of said pump.

24. A food treating system, comprising, means forming a conveyor conduit, a pump within said conduit for normally urging a mixture of liquid and legumes through said conduit, means for closing the ends of said conduit, and means for effecting simultaneous sterilization of the interior of said pump and of said conduit when said closing means are effective.

25. A food treating system, comprising, means forming a conveyor conduit, a pump communicating with said conduit, shut-off valves at the suction side of said pump and at the discharge end of said conduit, and means for admitting sterilizing fluid to the interior of both said conduit and said pump when said valves are closed.

26. A food treating system, comprising, means forming an elongated conduit, a centrifugal pump having a rotor within said conduit for propelling a mixture of liquid and legumes therethrough, valve means at the suction side of said pump and near the discharge end of said conduit, and means for admitting sterilizing fluid to both the interior of said conduit and said pump rotor when said valve means are closed.

FRANK D. CHAPMAN.

DISCLAIMER 2,049,639.—*Frank D. Chapman*, Berlin, Wis. TREATING FOOD PRODUCTS. Patent dated August 4, 1936. Disclaimer filed October 27, 1938, by the assignee, *Berlin Chapman Company*.

Hereby enters this disclaimer of claims 1, 2, 3, 4, and 17 in said specification.
[*Official Gazette November 15, 1938.*]

effective length of said conduit beyond said pump.

22. A food treating system, comprising, means forming a conduit, a pump for propelling a mixture of liquid and legumes through said conduit, means for heating a medial portion of said conduit beyond said pump, and means for delivering a vortex of the mixture into said conduit in advance of said pump.

23. A food treating system, comprising, a series of superimposed tubular sections having their corresponding ends connected to provide an elongated conduit, a centrifugal pump having a rotor within said conduit for propelling a mixture of liquid and legumes therethrough, means for heating said conduit beyond said pump, and means for delivering a vortex of the mixture into said conduit directly in advance of said pump.

24. A food treating system, comprising, means forming a conveyor conduit, a pump within said conduit for normally urging a mixture of liquid and legumes through said conduit, means for closing the ends of said conduit, and means for effecting simultaneous sterilization of the interior of said pump and of said conduit when said closing means are effective.

25. A food treating system, comprising, means forming a conveyor conduit, a pump communicating with said conduit, shut-off valves at the suction side of said pump and at the discharge end of said conduit, and means for admitting sterilizing fluid to the interior of both said conduit and said pump when said valves are closed.

26. A food treating system, comprising, means forming an elongated conduit, a centrifugal pump having a rotor within said conduit for propelling a mixture of liquid and legumes therethrough, valve means at the suction side of said pump and near the discharge end of said conduit, and means for admitting sterilizing fluid to both the interior of said conduit and said pump rotor when said valve means are closed.

FRANK D. CHAPMAN.

DISCLAIMER 2,049,639.—*Frank D. Chapman*, Berlin, Wis. TREATING FOOD PRODUCTS. Patent dated August 4, 1936. Disclaimer filed October 27, 1938, by the assignee, *Berlin Chapman Company*.

Hereby enters this disclaimer of claims 1, 2, 3, 4, and 17 in said specification.
[*Official Gazette November 15, 1938.*]

DISCLAIMER 2,049,639.—*Frank D. Chapman*, Berlin, Wis. TREATING FOOD PRODUCTS. Patent dated August 4, 1936. Disclaimer filed October 27, 1938, by the assignee, *Berlin Chapman Company*.

Hereby enters this disclaimer of claims 1, 2, 3, 4, and 17 in said specification.
[*Official Gazette November 15, 1938.*]